US005759391A

United States Patent [19]

Stadtmuller

[11] Patent Number: 5,759,391

[45] Date of Patent: Jun. 2, 1998

[54] MAGNETIC SEPARATORS

[76] Inventor: Adam Stadtmuller, Carpco SMS, 30 Bellclose, West Drayton, Middlesex, United Kingdom, UB7 9DE

[21] Appl. No.: 681,487

[22] Filed: Jul. 23, 1996

Related U.S. Application Data

[63] Continuation of Ser. No. 119,232, Feb. 16, 1994, abandoned.

[30] Foreign Application Priority Data

Mar. 25, 1991 [GB] United Kingdom .................... 9106284

[51] Int. Cl.[6] .................................................... B01D 35/06

[52] U.S. Cl. .......................... 210/222; 210/344; 210/439; 210/456

[58] Field of Search .................................... 210/222, 223, 210/344, 439, 456, 695; 209/224, 232; 96/2

[56] References Cited

U.S. PATENT DOCUMENTS

| | | | |
|---|---|---|---|
| 311,257 | 1/1885 | Piefke | 210/344 |
| 3,979,288 | 9/1976 | Heitmann et al. | 210/222 |
| 4,033,864 | 7/1977 | Nolan et al. | 210/222 |
| 4,046,681 | 9/1977 | Marston et al. | 210/222 |
| 4,079,002 | 3/1978 | Iannicelli | 210/222 |
| 4,124,503 | 11/1978 | Watson | 210/222 |
| 5,122,296 | 6/1992 | De Reuver | 209/224 |

FOREIGN PATENT DOCUMENTS 1388779 3/1975 United Kingdom .

OTHER PUBLICATIONS

M. Parker, "Recent Developments in High Field Magnetic Separation", University of Salford, U.K., date unknown.

*Primary Examiner*—Matthew O. Savage
*Attorney, Agent, or Firm*—Myers, Liniak & Berenato

[57] ABSTRACT

A magnetic separator for separating magnetizable particles from a fluid is described herein. The separator includes a separating chamber having an inlet and outlet and a magnetic field generator for establishing an axial magnetic field within the separating chamber. Two or more magnetizable matrix elements are stacked axially within the chamber. A fluid distributor is provided for dividing a stream of fluid containing magnetizable particles supplied to the inlet of the chamber into two or more portions and directing each portion axially through a respective matrix element and thence to the outlet.

5 Claims, 3 Drawing Sheets

FIG. 1
PRIOR ART
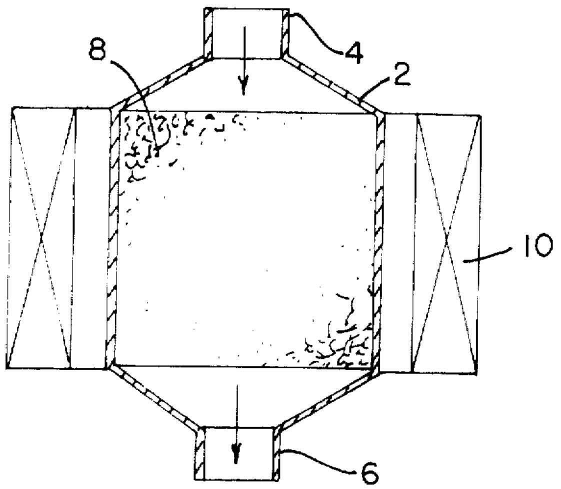
FIG. 3
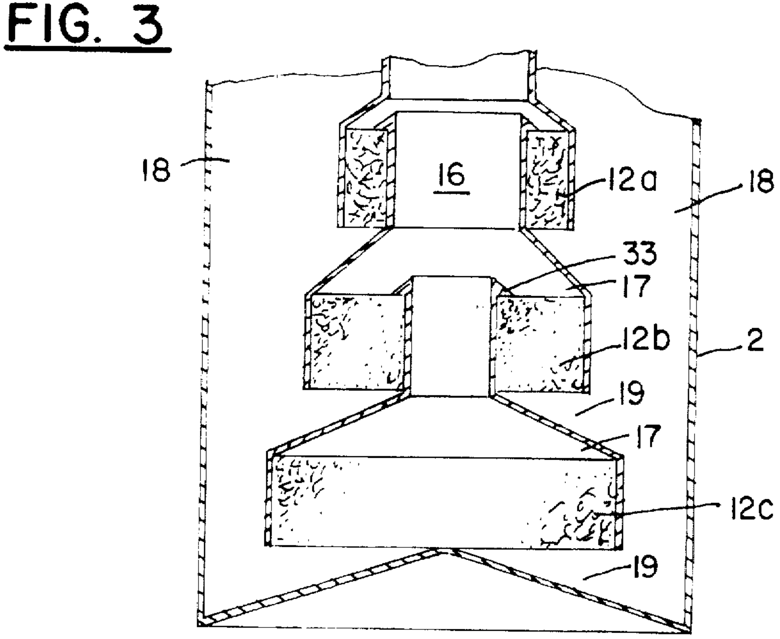
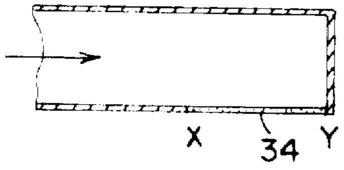
FIG. 4A
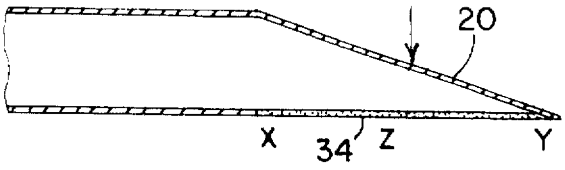
FIG. 4B

MAGNETIC SEPARATORS

This is a continuation of application Ser. No. 08/119,232, filed on Feb. 16, 1994, now abandoned.

This invention relates to magnetic separation devices, in particular to the type of device in which magnetic particles are removed from a stream of material by feeding the stream on or through stationary magnetic material, the magnetic particles being held or "trapped" by the magnetic material and therefore extracted from the stream.

One form of magnetic separation device which functions by magnetic particle entrapment is generally referred to as a High Gradient Magnetic Separator or HGMS. An HGMS comprises a canister containing a liquid permeable packing of magnetizable material between the canister inlet and outlet. The packing material may be paramagnetic or ferromagnetic and may be in particulate or filamentary form, for example, it may comprise wire wool, wire mesh, knitted mesh or steel balls. The packing may be in the form of a single block which essentially fills the canister or it may be other forms, for example, concentric cylinders or rectangular plates. The term "matrix" is generally employed to refer to the packing and this is used, in the case where the packing is divided into a number of elements, by some in the industry to refer to the individual elements and by others to refer to the totality of the packing. The term will be employed herein in the latter way.

The canister is surrounded by a magnet which serves to magnetize the matrix contained therein, the magnet generally being arranged to provide a magnetic field in the direction of the canister axis. With the matrix magnetized, a slurry of fine mineral ore or clay in water is fed into the inlet of the canister. As the slurry passes through the canister the magnetizable particles in the slurry are magnetized and captured on the matrix. Eventually, the matrix becomes substantially completely filled with magnetizable particles and the rate of capture decreases so that the quantity of magnetizable particles in the treated slurry leaving the outlet of the canister reaches an unacceptably high level. The slurry feed is then stopped and the canister rinsed with water to remove all non-magnetic material from the matrix. The magnetic field is reduced to zero and the matrix is scoured with high-speed wash water to remove the magnetizable particles therefrom.

The processing capacity of an HGMS is proportional to the product of the surface area of the matrix to which the slurry is fed and the velocity of the slurry through the matrix. It is also dependent on the depth of the matrix since the greater this is, the more chance that a magnetizable particle will be trapped. However increasing the length beyond the limit required to ensure satisfactory performance, that is, to give a reasonable chance of particle capture, does not enhance the capacity of the separator. An increase in slurry velocity will increase capacity but will also cause a corresponding decrease in the possibility of capture of a magnetizable particle. Thus, the velocity can only be increased to a certain limit since, beyond this, the quality of product will suffer.

Accordingly, efforts to increase capacity have been centred on designing HGMS with large matrix surface areas. This has led to the employment of a single element matrix of large diameter with a relatively short axial length located within a correspondingly shaped magnet. With electromagnets, pole pieces are arranged at each end of the canister around the inlet and outlet thereto to concentrate the flow of magnetic flux longitudinally through the matrix. The limiting factor on the size of matrix elements which can be used for such arrangement is the maximum depth of the magnetic field which it is possible to achieve.

A problem with the arrangement described above is that it cannot be employed efficiently with the process described in U.S. Pat. No. 4,124,503. In that process, two canisters are provided, alternately movable into a zone where the matrix therein is magnetized. While one of the canisters is in this zone, the other is being rinsed and washed. This process is very economical and practical since it allows almost continuous treatment of feed slurry, the feed being stopped only when the canisters are actually being moved. For best results with HGMS a super-conducting magnet is employed and this is indicated to be preferred to the process of U.S. Pat. No. 4,124,503. It is the use of a super-conducting magnet and the need for canisters which can be moved into and out of a magnetic field which prevents a short, large diameter matrix being employed efficiently in the process of U.S. Pat. No. 4,124,503. The reasons why this is so are twofold and they are as follows.

Firstly, a uniform field is required for good results and this can only be obtained with the short, large diameter magnet, which is necessary to use with a short, large diameter matrix, by employing iron pole pieces. However, the use of such iron pole pieces means that the canisters cannot be readily moved into and out of the magnetic coil which is an essential feature of the operation of the process of U.S. Pat. No. 4,124,503. Secondly, super-conducting magnet design favours a coil whose length is about twice its diameter, this arrangement providing a laterally uniform magnetic field without the need for pole pieces. This form of superconducting magnet provides a higher field than is achievable with a shorter magnet with iron pole pieces since, in the latter case, a limit is set by the fact that iron saturates at a magnetic flux equivalent to approximately 2 Tesla whereas in the former case a uniform field is readily achievable with magnetic fluxes equivalent to about 5 Tesla. However, of course, this form of super-conducting magnet dictates that the matrix is also of a length twice its diameter, i.e., the complete opposite to the desired matrix aspect ratio discussed above.

In order to increase effective surface area, within the constraints provided by the use of super-conductive magnet and the need for the canisters to be removable from the magnet, U.S. Pat. No. 4,124,503 proposes employing a matrix in the form of a tube, the slurry being fed into the centre of the tube and then radially outwards therethrough. Other suggestions for maximising the matrix surface area are, for example, to provide multiple thin cross-section matrices arranged parallel to the axis of the canister in the form of two rectangular sections, a series of concentric tubes or as an array of rectangular sections. However, all these arrangements suffer from the deficiency that the flow of the slurry through the matrix is transverse to the axis of the canister and hence to the direction of the magnetic field. It is known that the effectiveness of the capture of magnetizable particles is less when the slurry is fed through the matrix transverse to the magnetic field than when it is fed parallel thereto.

A magnetic separator for separating magnetizable particles from a fluid, in accordance with the invention, comprises a separating chamber having an inlet and an outlet, means for establishing an axial magnetic field within the chamber, two or more matrix elements positioned axially one above the other within the chamber and a flow separation means for dividing a stream of fluid containing magnetizable particles supplied to the inlet into two or more portions and directing each portion axially through a respective matrix element and thence to the outlet, the flow separation means comprising a supply pipe and a return pipe, each of which is provided with branch passageways for respectively feeding fluid to each matrix element from the supply pipe and passing fluid therefrom back to the return pipe, characterised in that one of the supply pipe and the return pipe comprises a channel passing centrally through the matrix elements and the other of the supply pipe and the return pipe comprises an annular tube surrounding the matrix elements.

The advantage of this arrangement is that by providing two or more, stacked, matrix elements and feeding a portion of the slurry to each, for a given slurry feed amount, a greater matrix element area is provided. As noted above processing capacity is proportional to, inter alia, the matrix area and thus, by increasing the area, the processing capacity is increased. Furthermore, the slurry is fed through the matrix elements in an axial direction, that is, parallel to the magnetic axis field which, as noted above, gives the greatest effectiveness of capture of magnetizable particles. The overall result is that a better quality, in terms of removal of magnetizable particles from the slurry, and higher capacity process can be achieved.

The total matrix volume will obviously be less than when a single matrix element is employed which essentially fills the chamber. However, the loss in matrix volume is more than compensated for by the increased matrix area and effectiveness of capture due to the feed being parallel to the magnetic field.

As noted above, the multiple matrix elements present a large matrix area to the incoming feed slurry. The fact that the elements are stacked however means that, overall, the arrangement is one in which the length of the matrix, and hence that of the chamber, can readily be made greater than its diameter. This makes the arrangement particularly suitable for use with a super-conducting magnet.

A further advantage of the arrangement of the matrix elements is that the magnetic separator can be modified to cope with slurries which contain differing amounts of magnetizable particles simply by changing the number of matrix elements and/or the depth of each element. The canister and, more importantly since this is the most expensive component, the magnet stay the same. Thus the arrangement is very versatile but in an extremely economic way.

Moreover the arrangement allows simple predictions of capacity from laboratory scale experiments. Such experiments are generally performed on a separator with a single matrix when the flow is parallel to the direction of the magnetic field. From the results of such experiments a reasonably accurate prediction of the capacity of the separator of this invention could be made simply by multiplying the measured capacity by the number of matrix elements employed in the separator. Conversely the measured capacity can be used to calculate the number of elements required for a particular desired operational capacity.

The flow control means is preferably arranged to divide the stream into equal portions. This allows each matrix element to be used to its full capacity since it ensures that one element is not filled with magnetizable particles before the others. The flow control means comprises a supply pipe and a return pipe, one of which comprises a cylindrical channel which passes through the matrix elements whilst the other of which comprises an annular tube surrounding the matrix elements. In either case, the internal cross-sections of the supply and return pipes preferably differs along the length thereof. The advantage of providing the supply and return pipes with internal cross-sections which differ along their lengths is that, by suitably arranging the internal cross-section, one can ensure that the velocity and pressure of the feed slurry is maintained constant along the length of the supply and return pipes, which ensures that the portions into which the stream of slurry is divided are equal in size.

A flow divider element may be provided within the supply and return pipes co-axially therewith, the divider element, in the case where the pipe is a cylindrical channel, comprising a rod the diameter of which differs along its length whereby the internal cross-section of the supply pipe also differs along its length. In the case where the pipe is an annular tube, the element will be attached to the interior of the external wall thereof and will comprise a tubular liner, the internal diameter of which differs along its length whereby the internal cross-section of the pipe also differs along its length.

The flow divider element of the supply pipe or the return pipe, suitably comprises n−1 regions for a separator with n matrix elements, a region being associated with each matrix element below the matrix element which is uppermost, the diameter of the region associated with a particular matrix element being greater than that associated with the element thereabove, the divider element expanding smoothly between each region thereof. With a supply pipe or a return pipe of cross-sectional area x, the uppermost region of the divider element may be $1/(n-1)x$ and the area of each succeeding region may be greater by $1/(n-1)x$. This formation of divider element will result in a supply pipe, or return pipe, with an internal cross-sectional area which decreases in steps along its length from the uppermost point thereof. The decrease in cross-sectional area will result in slurry fed along the pipe having constant velocity. This result is important since it ensures that equal portions of slurry are fed to each matrix element and thus that each element is equally loaded with magnetisable particles.

Alternatively, the internal cross-sections of the supply and return pipes may be varied by varying the size of the matrix elements, in particular by making these with different inner and outer radii. The inner radius of successive matrix elements may progressively decrease, to correspondingly decrease the internal cross-section of the central channel, with the last matrix element having a zero inner diameter i.e. being circular rather than annular. The outer diameters of successive matrix elements may, in a similar fashion, progressively increase to give a corresponding decrease in the internal cross-section of the annular tube. The result again will be that slurry fed along the pipes will have constant velocity and accordingly equal amounts of slurry will be fed to each matrix element. The advantage of this flow control arrangement is that the total matrix volume is greater but it does impose a requirement for each matrix element to be individually made.

Guide elements, suitably in the form of a ring of right-triangular cross-section, may be provided at the inner and/or outer edge of each matrix element to improve the flow and prevent it from becoming turbulent.

An annular space may be provided between each adjacent pair of matrix elements which opens into the supply pipe and the return pipe, each annular space being divided, by a conical plate, into a feed passage way for the lower adjacent element and a return passage way for the upper adjacent element. The conical plate(s) may be positioned at an angle to, and extend between, the faces of the matrix elements above and below the annular space. This ensures that the pressure of fluid supplied to a matrix element will be relatively constant across the face of that element which will give uniform flow through the element and consequent optimal results.

Additionally, or alternatively, to the use of the angled plates, a porous plate may be provided across the faces of the matrix elements to which slurry is fed and from which it is returned. The use of a porous plate mitigates the effect of any pressure difference existing across the face and so ensures uniform flow across the face of the matrix element due to the significant and known uniform pressure drop across the plate.

As a result of the fact that the magnetic separator is very suitable for use with super conducting magnets and, in particular, does not require a short, large diameter magnet with pole pieces, the chamber can readily be removed from the magnet and therefore the arrangement can be employed in a process of the type described in U.S. Pat. No. 4,124,503. Accordingly in a preferred embodiment, the magnetic separator comprises two chambers and the means for establishing an axial field therein comprises a magnet for establishing a magnetic field into which the chambers can alternately be positioned such that their axes are aligned with the field.

The invention will now be further described by way of example with reference to the accompanying drawings in which:

FIG. 1 is a schematic view of a High Gradient Magnetic Separator;

FIG. 3 is a vertical section through a sketch of a second embodiment of a magnetic separator in accordance with the invention;

Figure 2:
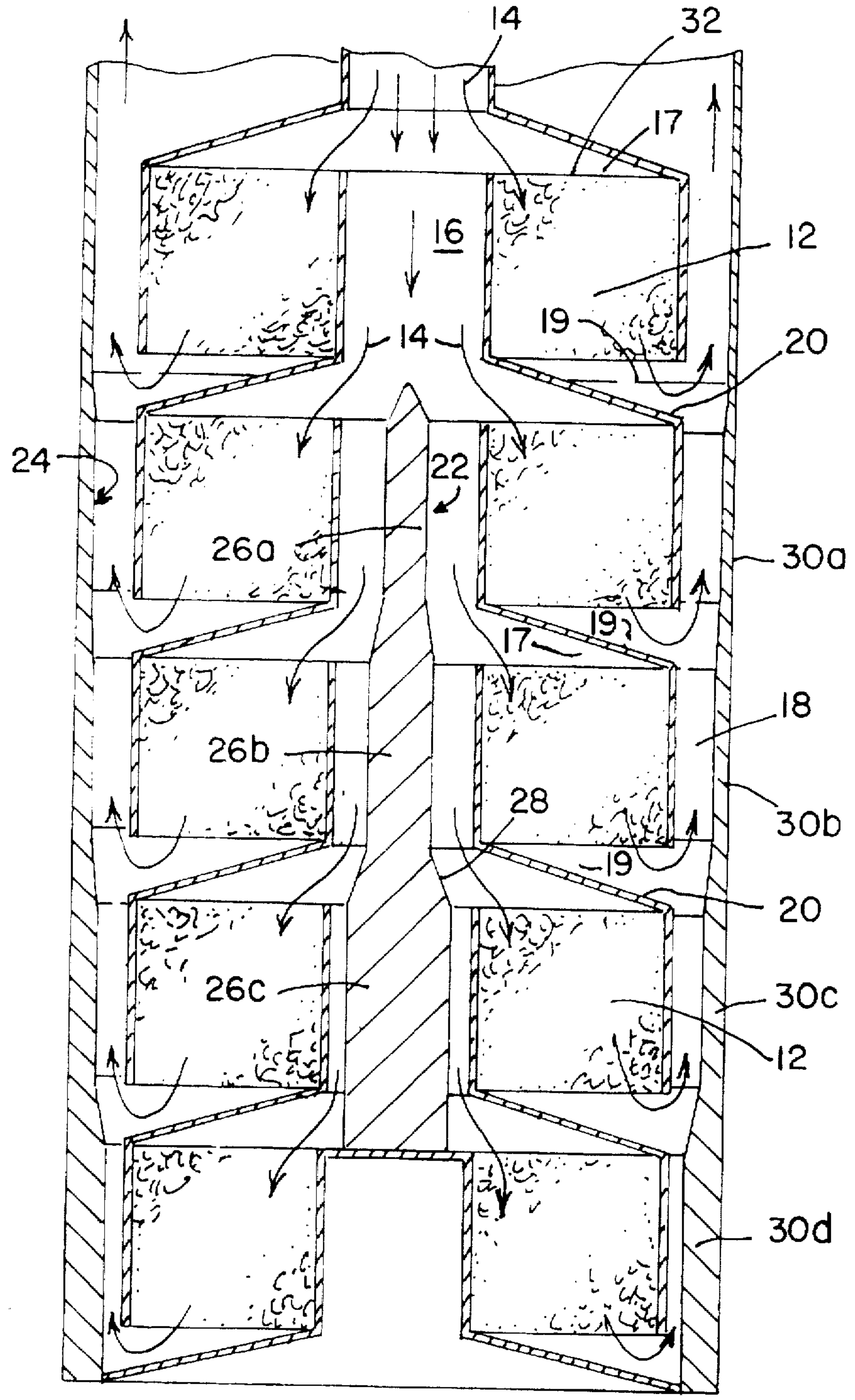
FIG. 2 is a vertical section through one embodiment of a magnetic separator in accordance with the invention.
Figure 5A:
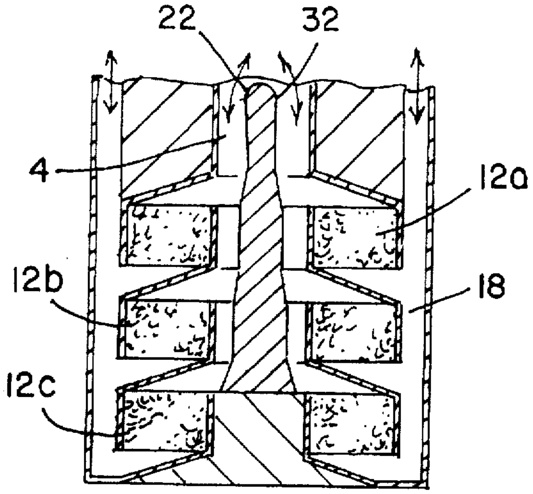
Figure 5B:
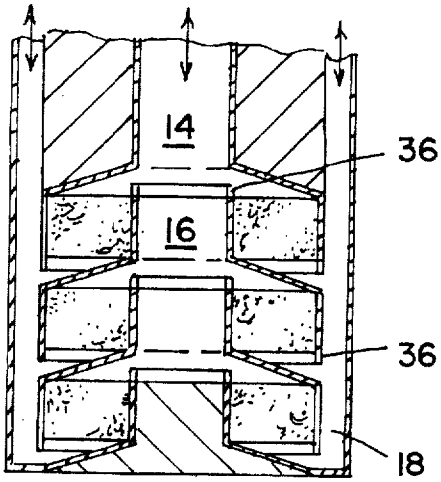
Figure 5C:
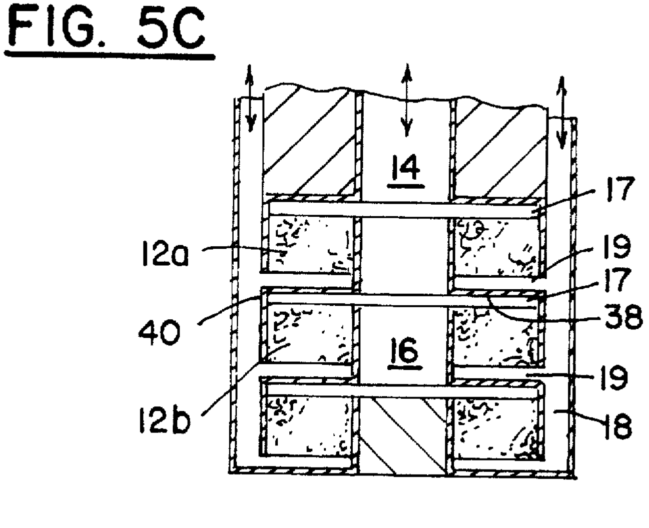

FIGS. 4*a* and 4*b* are sketches which illustrate the feed to each element of the magnetic separators of FIGS. 2 and 3; and FIGS. 5*a*, 5*b* and 5*c* are sketches of alternative arrangements of the magnetic separators of FIGS. 2 and 3.

FIG. 1 shows, in schematic form, the basic components of a High Gradient Magnetic Separator, HGMS. These are: a canister 2 with an inlet 4 and an outlet 6, and, a matrix 8 within the canister formed from, for example, wire wool, wire mesh, knitted mesh, steel balls or other particulate or filamentary forms, the material of the matrix being magnetizable. Surrounding the canister 2 is a magnet 10 which may be an electromagnet or a super-conducting magnet, the magnet 10 serving to magnetize the matrix 8. A slurry of mineral ore or clay in water containing magnetizable particles is fed through the inlet 4 so that it passes through the matrix 8 and exits the canister via the outlet 6, as shown by the arrows on FIG. 1. The magnetizable particles in the slurry will be trapped by the matrix 8 and therefore removed from the slurry.

The magnetic field produced by the magnet 10 will generally be in the direction of the axis of the canister 2. If the matrix 8 comprises a single element sized to essentially fill the centre of the canister 2, the flow of the slurry therethrough will be parallel to the magnetic field which will give the greatest effectiveness of magnetizable particle capture. However, in many known devices, the flow of the slurry through the matrix 8 is transverse to the axis of the canister 2 and hence also to the magnetic field. This is achieved by forming the matrix as, for example, a tube and providing flow control means arranged to direct the slurry down into the centre of the tubular matrix 8, radially therethrough and then down between the exterior of the tubular matrix 8 and the canister walls to the outlet 6. The capture effectiveness with this transverse arrangement is less. The reason for its use is to try and maximize the cross-sectional area of the matrix through which slurry flows within the constraints that the length of the canister 2 is greater than its diameter, as discussed above.

The magnetic separator of FIG. 2 has a canister 2 whose length is greater than its diameter but the matrix 8 is so arranged that the cross-sectional area of matrix through which a slurry to be separated is fed is greater than that of known transverse arrangements. Moreover, the slurry is feed through the matrix 8 in a direction parallel to the magnetic field within the canister 2 which will give greatest capture effectiveness.

This is achieved by providing the matrix in the form of a plurality of annular matrix elements 12 stacked one above the other within the canister 2. These elements 12 are fed in parallel, i.e., simultaneously, from a slurry stream supplied to the inlet of the canister 2.

It will be appreciated that by providing the multiple matrix elements 12 in place of a solid matrix essentially filling the canister 2, the surface area presented to the feed slurry is increased by a factor equal to the number of elements 12. This will lead to a corresponding increase in processing capacity for a canister of a given size. Whilst there is loss in matrix volume associated with providing the matrix 8 in the form of elements 12, when compared with a solid cylindrical matrix, this is outweighed by the increase in area compared with known axial flow arrangements as well as by the improvement in capture effectiveness, which results from the axial feed direction, compared to known radial flow arrangements.

The separator shown in FIG. 2 is provided with flow control means for dividing a stream of fluid containing magnetizable particles supplied to the inlet of the canister 2 into a number of portions and directing each portion axially through a matrix element 12, as illustrated by arrows 14. The flow control means is essentially constituted by the central supply pipe 16 through the elements 12, and annular return pipe 18 surrounding the elements 12, each of which pipes 16, 18 has a variable internal cross-section, and branch passage ways 17, 19 from and to the pipes 16, 18 provided by dividing the annular space between each adjacent pair of elements with frustro-conical plates. The supply pipe 16 is connected to the inlet whilst the return pipe 18 is connected to an outlet (not shown) which is at the upper end of the canister.

As mentioned above, both the supply pipes 16 and return pipes 18 have variable internal cross-sectional areas. This is achieved by providing each with a divider element, 22, 24. The supply divider element 22 is in the form of a rod of variable cross-sectional area, in particular, it comprises a number of constant diameter regions 26*a*, *b*, *c*, each of which is associated with a particular matrix element 12, the constant diameter regions 26*a*, *b*, *c* being connected by smoothly tapered expansion sections 28. The diameter of the regions 26*a*, *b*, *c* is arranged so that if there are n matrix elements 12 and the area of the supply pipe 16 is x at the uppermost matrix element 12, the area of the supply pipe 16 at each successive matrix element 12 is decreased by an amount equal to $1/(n-1)$ x. Thus the divider element 22 has $n-1$ regions which successively are of area $1/(n-1)$ x, $2/(n-1)$ x . . . up to x. In fact the divider element 22 need not include a region of cross-sectional area x, that is, a $n-1$ the element but instead the base of the canister 8 can be suitably shaped to effectively provide this.

The divider element 24 of the return passage 18, which is in the form a tubular liner, also comprises regions 30*a*, *b*, *c*, *d* the thickness of successive ones of which down the canister increases by regular amounts of $1/(n-1)$ x, where x is the area of the return pipe at the uppermost matrix element 12.

The result of the varying internal cross-sectional area of the supply and return pipes 16, 18 and in particular the regular decrease in the cross-sectional area of the supply pipes 16 at each successive matrix elements 12 is that the velocity and pressure of fluid in the pipe 16 is constant therealong and the flow to each matrix element 12 is equal. This is further ensured by providing inlet 4 with a cross-sectional area equal to n/(n−1) x.

To increase the stability of the system, the divider element 22 could be connected by an anchoring rod to the inlet. Alternatively, the element 22 can extend above the matrix stack as illustrated in FIG. 5*a*. This increases stability and facilitates element location. The area x employed in the calculation of element region size is then between the uppermost end 32 of the element 22 and the sides of the inlet 4.

In the alternative embodiment shown in FIG. 3, the divider elements 22 and 24 are dispensed with and internal cross-section of the supply and return pipes 16, 18 is varied by providing matrix elements 12 of varying size. The inner radii of successive elements 12*a, b, c* progressively decreases from a maximum at element 12*a* to a minimum of zero at element 12*c* which is therefore circular rather than annular. The outer radii of the elements 12*a, b, c* progressively increases. The radii may be arranged to cause a decrease in area of the supply pipe 16 at successive matrix elements equal to that achieved in the embodiment of FIG. 2, that is, a decrease of 1/(n−1)x where x is the area of the supply pipe 16 at the uppermost element 12*a*. The result of this is the same as is achieved by the use of divider element 22 and 24, i.e., the velocity and pressure of fluid in the pipes 16, 18 is constant therealong. The arrangement of FIG. 3 has the advantage that there is a greater matrix volume than with the arrangement of FIG. 2.

To improve flow and prevent it from becoming turbulent guide elements in the form of triangular cross-section rings 33 may be secured at the inner edge of each element 12*a, b, c*, as shown in FIG. 3.

The faces of the matrix elements 12 to which fluid is fed and from which fluid is collected are formed by porous plates 34. This ensures that the flow to the matrix elements 12 is substantially uniform across the faces thereof and therefore that their full capacity is utilised. The reason for this will be explained with reference to FIG. 4*a* which is a sketch showing fluid flow to a closed-ended rectangular section tube with one porous face 34. The pressure at point x will be greater than the pressure at point y and if, instead of the porous plates 34 there were simply a gap, the velocity of the fluid at x would be greater than that at y which would result in uneven flow across the gap. The porous plate 34 produces a pressure differential thereacross and if this is much greater than the difference between the pressure at x and that at y then the velocity of fluid at both these points is approximately the same so that the flow through the porous plate 34 will be even across its extent.

A further improvement in flow uniformity is achieved by the use of the frustro-conical plates 20 illustrated in FIGS. 2 and 3. The effect of these will now be described with reference to the sketch of FIG. 4*b* which shows a rectangular section tube with an angled plate 20 at its end. Consider a plane half way along the wedge shaped region defined by the plate 20, i.e., at Z. The cross-sectional area at Z is half of that at X but since only half the amount of fluid flows through the plane at Z the velocity of fluid at Z is equal to the velocity at X and accordingly, from Bernoulli's equation, the pressure at Z will equal that at X. Even with imperfect conditions the pressures will only slightly differ and accordingly the pressure drop across the porous plates 34 needs only to be slightly larger than the pressure drop along the length of the wedge-shaped region defined by plate 20 to ensure uniform flow through the porous plate 34.

The dividing plates 20 have been described as being simply frustro-conical in shape. This does not however give constant flow velocity. Preferably the plates 20 are formed so that the gap between the surface of a matrix element 12 and the plate 20 thereabove varies with radius according to the following relationship;

$$h = \frac{r_o^2 - r^2}{r} \quad \frac{Vm}{2Vr}$$

where h is the height at any radius r $r_o$ is the outer radius

Vm is the velocity of flow of slurry in matrix element 12

Vr is the required radial velocity of slurry flowing from the supply pipe into and through the annular spaces between the elements 12.

FIG. 5*b* illustrates an alternative arrangement to that of FIG. 3 in which the divider elements 22 and 24 are still dispensed with but the matrix elements 12 are not of variable size. In this case, the pipes 16 and 18 are converted to "infinite reservoirs" by increasing the pressure on the fluid at the entry and exit points to the annular spaced between the matrix elements 12. This can be achieved by using ring elements 36 attached to the edges of the elements 12 to restrict the openings between the pipes 16 and 18 and the annular spaces, as is illustrated in FIG. 5*b*.

FIG. 5*c* shows a still further alternative arrangement in which planar plates 38 rather than conical plates 20 are employed to form the feed passageways 17 and 19 respectively to and from the matrix elements 12. The planar plates 38 are mounted by circular flanges 40 to the elements 12 which restrict the flow in the same way and with the same result as the ring elements 36 described above, with reference to FIG. 5*b*. Even flow through the elements 12 is still produced with the planar plates 38 provided the pressure difference across the entry and exit faces of the elements 12 is sufficiently high. This can be achieved, as described in detail above, by use of porous plates 34 across the faces. Furthermore by graduating the pressure radially across the porous plates 34, e.g., by varying the orifice diameter thereof as a function of radial displacement, a nearly exactly uniform flow distribution thereacross can be produced.

Fluid flowing through the separator from the inlet moves axially along the supply pipe, radially between two elements, axially through the lower of the two elements, radially between that element and the one therebelow and then axially along the return pipe.

The magnetic separator shown in FIGS. 2, 3 and 5 provides a large matrix surface area which will give correspondingly high processing capacity. The maximum capacity of each element is utilised. The flow of slurry through the matrix elements 12 is parallel to the direction of the magnetic field axis which will give maximum capture effectiveness and therefore a very clean product. This is achieved within an overall canister arrangement in which the length can be, although this is not essential, greater than the diameter thereof. Accordingly, the arrangement is readily employed with a super-conducting magnet. Furthermore, because the separator can be used with a super-conducting magnet of the type which does not require pole pieces, the canister 2 can readily be removed from the vicinity of the magnet so that it can be replaced with another identical canister whilst the first is being rinsed and the magnetizable particles trapped therein washed out. This provides two benefits: firstly, the magnet is continuously energised which saves power dissipation as the magnet is not being continuously energised and de-energised. Secondly, a superconducting magnet provides a much higher magnetic field so gives better quality separations. The arrangement is therefore particularly suitable for the type of process described in U.S. Pat. No. 4,124,503.

I claim:

1. A magnetic separator for separating magnetizable particles from a fluid comprising:

a canister having an imperforate peripheral wall, a first end, a second end, an inlet, an outlet, and a central axis extending through said first and said second ends;

a plurality of annular matrix elements having opposite first and second faces that are open to fluid flow, said matrix elements coaxially surrounding said central axis and being axially spaced apart from one another, wherein said matrix elements each comprise a magnetizable liquid permeable packing material adapted to separate said magnetizable particles from said fluid;

means for establishing a magnetic field having lines of magnetic flux extending parallel to the central axis of said canister and axially through said matrix elements;

wherein each said matrix element includes a radially outer peripheral wall that is imperforate and a radially inner peripheral wall that is imperforate;

wherein said radially inner walls are coaxially aligned to define a central inlet channel extending axially through all of said matrix elements, said central inlet channel communicating with said inlet;

wherein each said radially outer wall is spaced from an inner surface of said imperforate peripheral wall of said canister and defining an annular outlet flow channel therebetween extending past all of said matrix elements, said annular outlet flow channel communicating with said outlet;

wherein the first face of each said matrix element is positioned closest to the first end of said canister, and the second face of each said matrix elements is positioned closest to the second end of said canister, each space between an adjacent pair of matrix elements having on one side the second face of the element closest to the first end and on the other side of the first face of the element closest to the second end;

flow separation means for directing flow from the central inlet channel solely to the first faces of the matrix elements and for directing flow solely from the second faces of the matrix elements to the outlet flow channel whereby the flow through each element is axially between the opposite faces thereof, said flow separation means defining first feed branch passageways between the inlet channel and the first faces of the elements within the spaces between the elements and defining second return branch passageways between the second faces of the elements and the outlet flow channel within the spaces between the elements.

2. A magnetic separator as claimed in claim 1, wherein the flow separation means is arranged to divide a volume of fluid supplied to the inlet into a number of equal portions equal to the number of elements and directs one of said equal portions to the first face of a respective one of said elements.

3. A magnetic separator as claimed in claim 1 wherein said flow separation means comprises a plurality of plates, wherein the space between each adjacent pair of matrix elements which opens into the supply pipe and return pipe is divided by a said plate into a said feed passageway and a said return branch passageway.

4. A magnetic separator as in claim 3 wherein each plate is positioned at an acute angle to and extends between the faces of the second and first elements located on either side of the respective space.

5. A magnetic separator as claimed in claim 1 wherein a first plate is provided between first end of the element closest to the first end of the canister and said first end of the canister and a second plate is provided between second end of said element closest to the second end of the canister and said second end of the canister.

* * * * *